United States Patent
Davidson

(10) Patent No.: US 7,146,170 B2
(45) Date of Patent: Dec. 5, 2006

(54) WIRELESS NETWORK MANAGEMENT SYSTEM

(75) Inventor: Darren J. Davidson, Aurora, IL (US)

(73) Assignee: Andrew Corp., Westchester, IL (US)

( * ) Notice: Subject to any disclaimer, the term of this patent is extended or adjusted under 35 U.S.C. 154(b) by 406 days.

(21) Appl. No.: 10/315,903

(22) Filed: Dec. 10, 2002

(65) Prior Publication Data
US 2004/0204110 A1    Oct. 14, 2004

(51) Int. Cl.
*H04Q 7/20* (2006.01)
(52) U.S. Cl. .................... 455/446; 455/453; 455/412.1
(58) Field of Classification Search ................ 455/421, 455/422.1, 432.3, 443, 444, 450, 446, 449, 455/452.1, 452.2, 562, 412.1, 453; 709/224, 709/219, 203, 206; 370/468, 477
See application file for complete search history.

(56) References Cited

U.S. PATENT DOCUMENTS

| | | | | |
|---|---|---|---|---|
| 5,276,907 | A * | 1/1994 | Meidan ....................... | 455/436 |
| 5,815,116 | A * | 9/1998 | Dunbridge et al. .......... | 342/373 |
| 5,966,094 | A * | 10/1999 | Ward et al. ................. | 342/373 |
| 6,118,767 | A * | 9/2000 | Shen et al. .................. | 370/252 |
| 6,141,565 | A * | 10/2000 | Feuerstein et al. .......... | 455/560 |
| 6,327,471 | B1 * | 12/2001 | Song .......................... | 455/440 |
| 6,330,459 | B1 * | 12/2001 | Crichton et al. .......... | 455/562.1 |
| 6,421,005 | B1 * | 7/2002 | Weaver et al. .............. | 342/367 |
| 6,456,652 | B1 * | 9/2002 | Kim et al. ................... | 375/224 |
| 6,640,104 | B1 * | 10/2003 | Borst et al. ................. | 455/450 |
| 6,829,491 | B1 * | 12/2004 | Yea et al. ................... | 455/560 |
| 2002/0032024 | A1 | 3/2002 | Namba et al. | |
| 2002/0062467 | A1 * | 5/2002 | Hunzinger ................... | 714/749 |
| 2002/0128027 | A1 * | 9/2002 | Wong et al. ................. | 455/513 |
| 2002/0161856 | A1 * | 10/2002 | Pineau et al. ............... | 709/219 |
| 2003/0093520 | A1 * | 5/2003 | Beesley ....................... | 709/224 |
| 2003/0093547 | A1 * | 5/2003 | Scheessele .................. | 709/231 |
| 2003/0095065 | A1 * | 5/2003 | Ericson et al. .............. | 342/354 |
| 2003/0119559 | A1 * | 6/2003 | Chitrapu ..................... | 455/562 |
| 2004/0095400 | A1 * | 5/2004 | Anderson et al. ........... | 345/864 |

FOREIGN PATENT DOCUMENTS

| | | |
|---|---|---|
| EP | 1 139 631 A1 | 10/2001 |
| GB | 2 350 749 A | 12/2000 |
| WO | WO 01/74046 A1 | 3/2001 |
| WO | WO 02/05383 A1 | 1/2002 |

OTHER PUBLICATIONS

*Cellular Antenna Technology—the Environment of Change*, pp. 40-43, What's New in Radio Communications, Aug./Sep. 1998.

3 pages from http://www.metawave.com/Products/smartcell/smartcell_welcome.htm (Jul. 11, 2002).

4 pages from http://www.metawave.com/Products/CDMA/cdma_faq.htm (Jul. 11, 2002).

* cited by examiner

*Primary Examiner*—Jean Gelin
(74) *Attorney, Agent, or Firm*—Welsh & Katz, Ltd.

(57) ABSTRACT

A method of managing a wireless communication network including a plurality of antennas for communicating with devices via antenna beams, each antenna beam having a set of beam parameters. The method includes the steps of receiving a request from a device; modifying an antenna beam in response to the request by adjusting one or more of the beam parameters of the antenna beam; and communicating with the device via the modified antenna beam. Beam parameters which are adjusted may include azimuth width or angle, elevation width or angle, or beam power.

37 Claims, 5 Drawing Sheets

WIRELESS NETWORK MANAGEMENT SYSTEM

FIELD OF THE INVENTION

The invention relates to a method and apparatus for managing a wireless network. The invention may be used in a wireless network which communicates with mobile devices (such as cellphones or PDAs), for instance a cellular or PCS network. The invention could also be used in other types of wireless networks, such as wireless Local Area Networks (LANs).

BACKGROUND OF THE INVENTION

It is known to adjust the beam characteristics of the base station antennas in order to efficiently utilize network resources. U.S. Pat. No. 6,141,565 describes a system which determines network conditions, and selects a network parameter optimized with respect to the determined network conditions. The network conditions are determined by monitoring selected network attributes, such as signal levels, bit error rates, frame error rates, voice quality measurement, data throughput, packet success probabilities, dropped call rates, call origination and/or termination success rates, or the like. The network parameters adjusted at the base station may include sector orientation/rotation, sector or beam outboard reach, through attenuation or gain adjustment and/or antenna downtilt/uptilt.

BRIEF DESCRIPTION OF EXEMPLARY EMBODIMENT

A preferred embodiment of the invention provides a method of managing a wireless communication network, the network including a plurality of antennas for communicating with devices via antenna beams, each antenna beam having a set of beam parameters, the method including the steps of:
  a) receiving a request from a device;
  b) modifying a first antenna beam in response to the request by adjusting one or more of the beam parameters of the first antenna beam; and
  c) communicating with the device via the modified first antenna beam.

In contrast with U.S. Pat. No. 6,141,565 (which adjusts parameters in response to changes in overall network conditions), the invention adjusts parameters in direct response to a request from a specific device.

The method of the preferred embodiment may also include the steps of transmitting a query to the device in response to the request, receiving a query response from the device; and performing step b) in accordance with the query response. For instance, the query may ask the user of the device whether they are willing to pay a fee for immediate download or upload, or whether they are willing to accept a certain download or upload time.

BRIEF DESCRIPTION OF THE DRAWINGS

The accompanying drawings which are incorporated in and constitute part of the specification, illustrate embodiments of the invention and, together with the general description of the invention given above, and the detailed description of the embodiments given below, serve to explain the principles of the invention.

DETAILED DESCRIPTION OF EMBODIMENTS OF THE INVENTION

Figure 1:
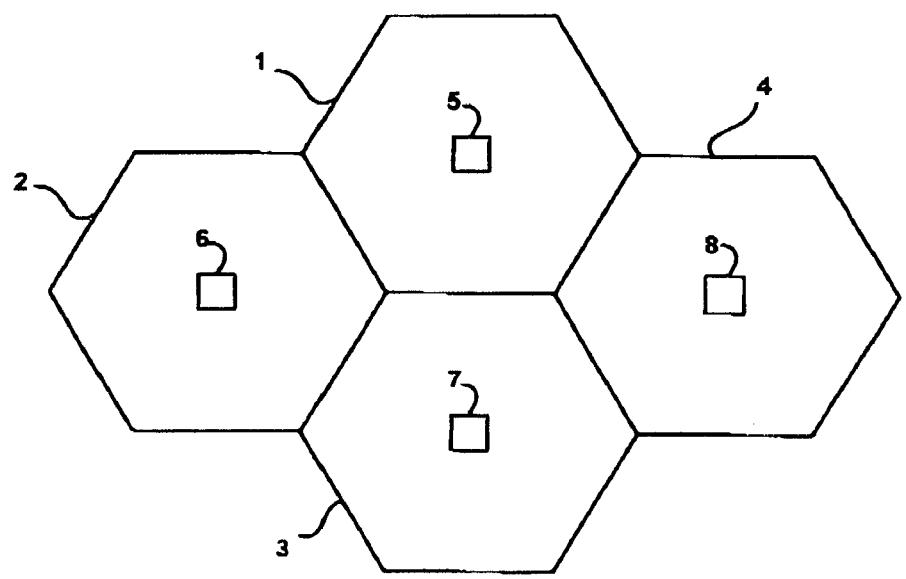
FIG. 1 is a schematic view of a wireless network.

Referring to FIG. 1, a cellular wireless network has a network of cells 1–4, each cell being serviced by a respective base station 5–8. Each base station both transmits downlink signals to and receives uplink signals from mobile devices which are registered in its respective cell.

Figure 2:
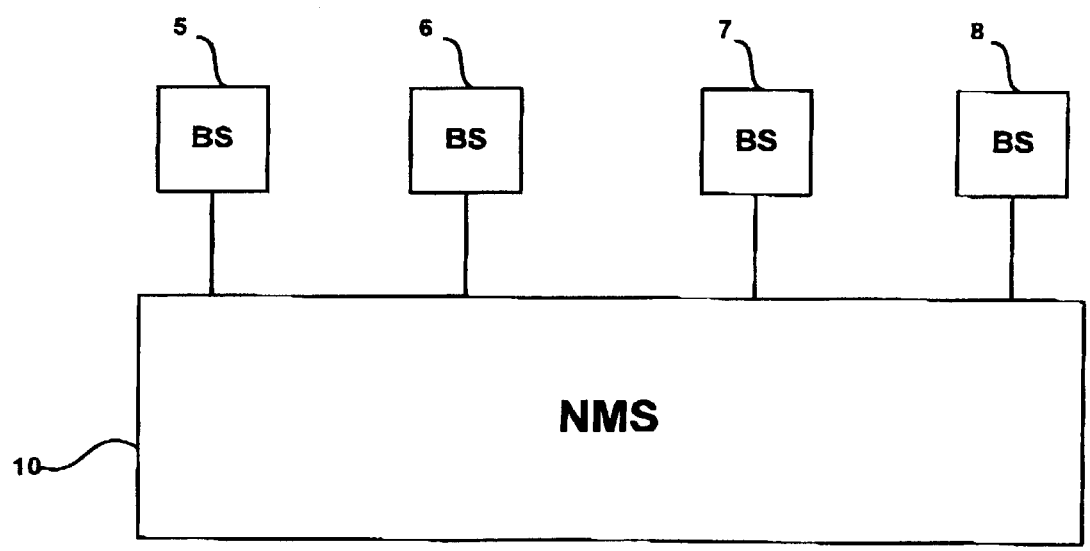
FIG. 2 is a schematic view of a Network Management System for controlling the network of FIG. 1.

The base stations 5–8 are controlled by a Network Management System (NMS) 10 shown in FIG. 2. The NMS is a software product running on a central server (not shown).

Figure 6:
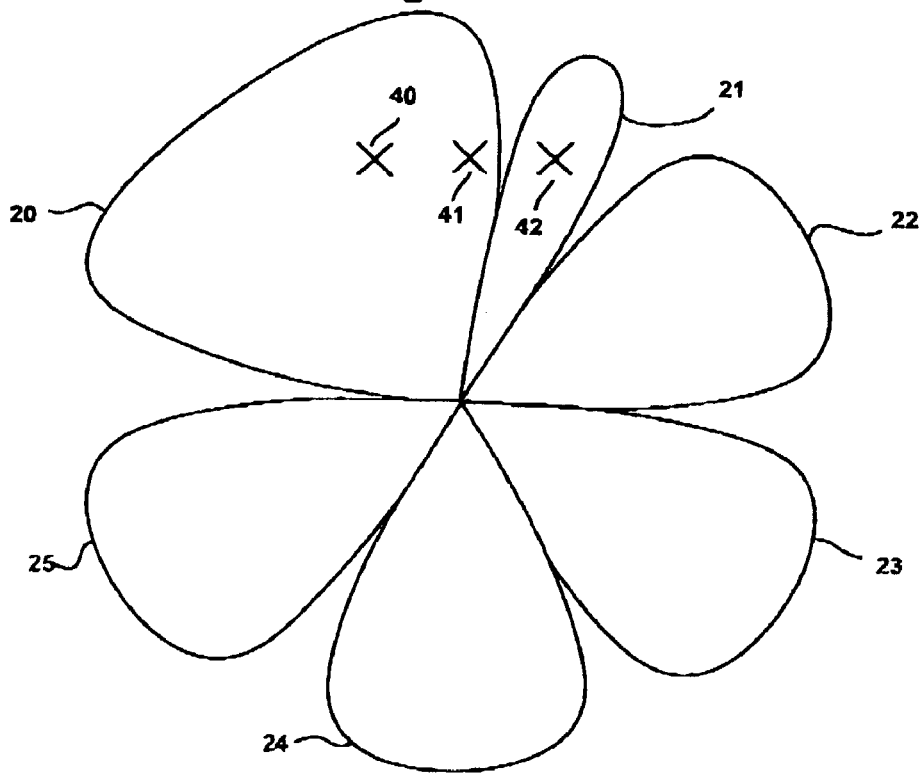
Figure 7:
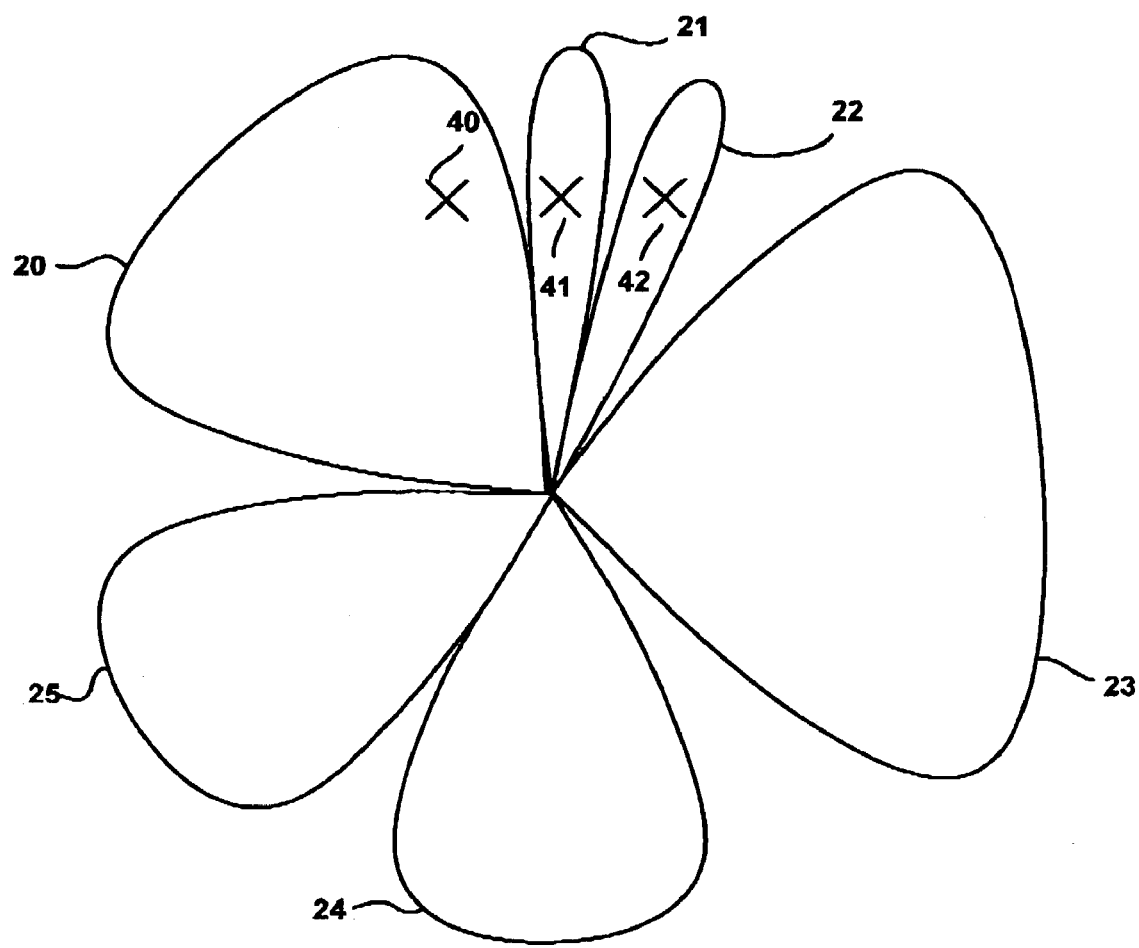
Figure 8:
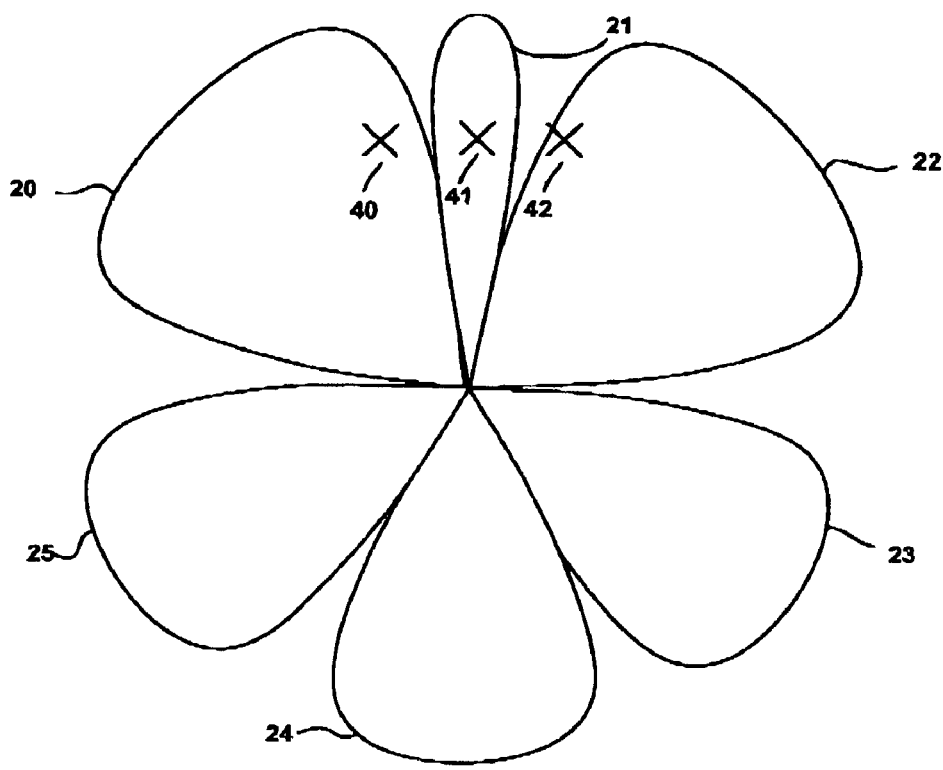
FIGS. 8 and 9 are views of one of the network cells, showing beam adjustment according to a third example.
Figure 9:
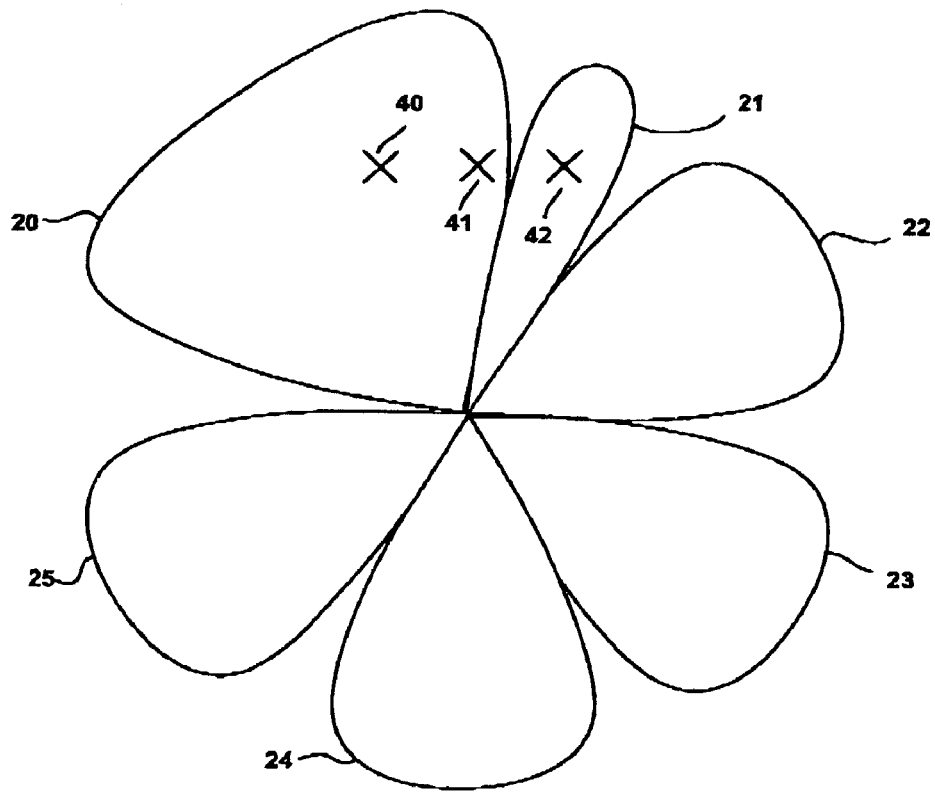

Three alternative network management procedures will now be illustrated with reference to FIGS. 3 and 4 (Example 1), FIGS. 5, 6 and 7 (Example 2), and FIGS. 8 and 9 (Example 3) which each show a set of beams for servicing one of the cells 1–4.

EXAMPLE 1

Figure 3:
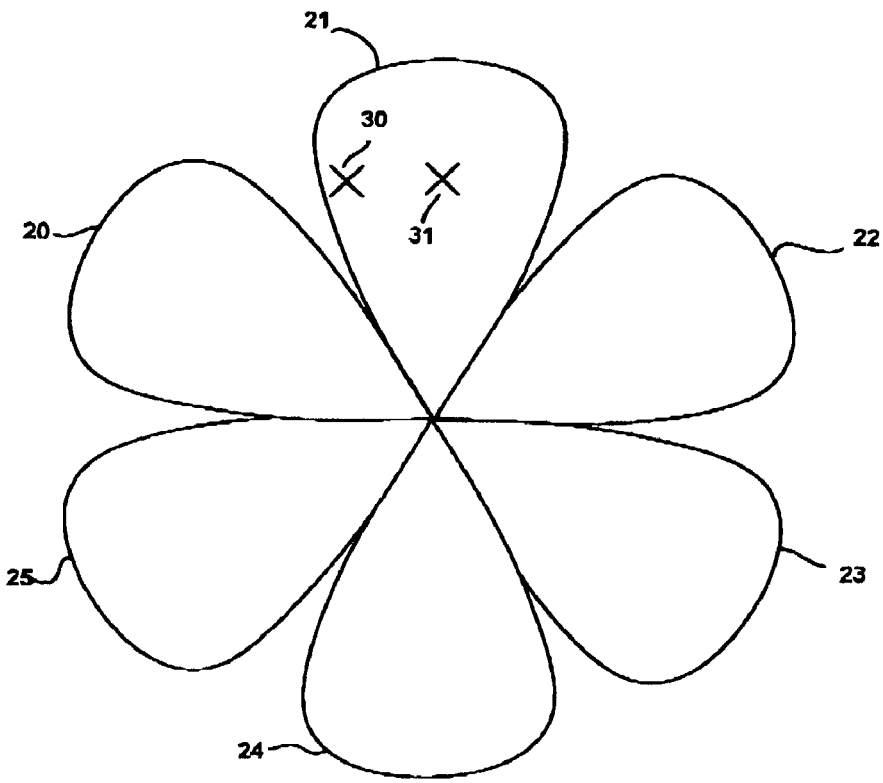
FIGS. 3 and 4 are views of one of the network cells, showing beam adjustment according to a first example.
Figure 4:
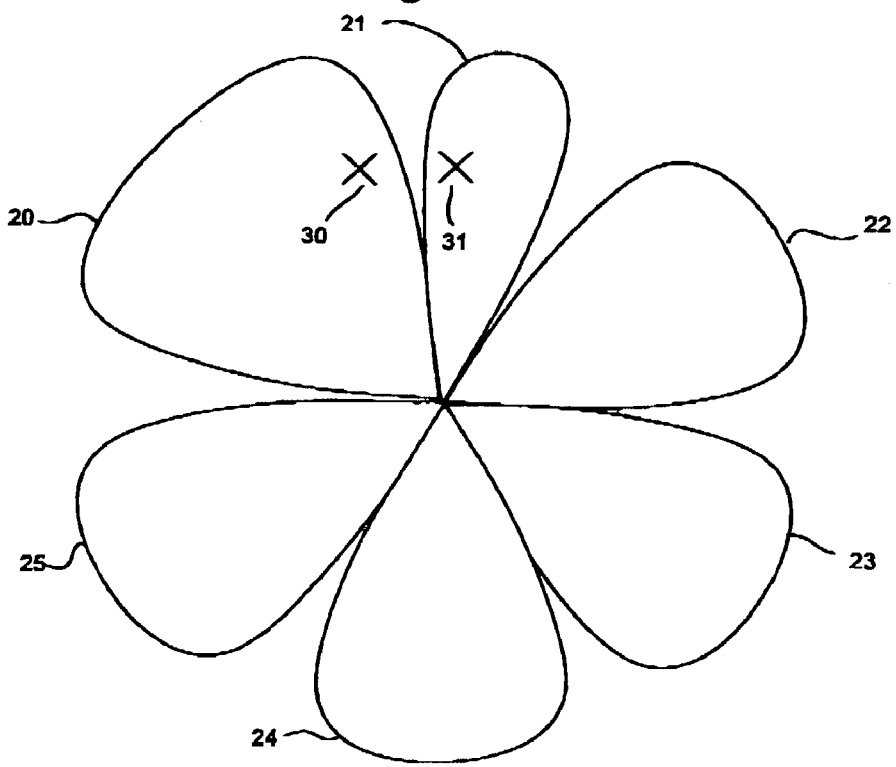

Each base station 5–8 has an array of antennas with a multi-beam radiation pattern shown in FIG. 3. Each beam 20–25 services a respective 60 degree sector of the cell 1.

A pair of mobile devices 30,31 are registered with beam 21. The method of Example 1 is as follows:
  1. Mobile device 31 sends a request to the NMS 10, requesting download of a large data file.
  2. The NMS 10 then sends a reply to the mobile device 31 depending on the size of the requested file. If the file meets or exceeds a predetermined threshold, then a message is sent to the mobile device 31 for display to a user, such as: "Thank you for your 100 Mb data request. If you wish to receive the data now, then please press 1. This will attract a surcharge of $10. If you are able to receive the data later, then please press 0 and the data will be sent to you at a later time with no surcharge".
  3. If the user enters "1", then the NMS 10 adjusts the network parameters to enable the data download. In this example, the network parameters are adjusted by:
      a. focusing the beam 21 onto the mobile device 31 as shown in FIG. 4;
      b. deregistering the mobile device 30 from the beam 21;
      c. broadening the adjacent beam 20 as shown in FIG. 4; and
      d. registering the mobile device 30 with the beam 20.
  4. The data download to device 31 is then made via focused beam 21.
  5. If the user enters "0" then the NMS 10 determines the Best Time for Download (BTD). This is done by performing a historical analysis of the network (for instance over the last month) to determine when the lowest data rates are being handled by the network. For instance this may turn out to be at 2 am on a Tuesday morning.
  6. The NMS 10 then sends a message to the mobile device such as "Download scheduled for 2 am Tuesday. OK?"

7. If the BTD is acceptable, then the user inputs an OK message and the data is downloaded at the BTD. The NMS 10 makes any necessary network changes at the BTD, such as the changes described above.

EXAMPLE 2

Figure 5:
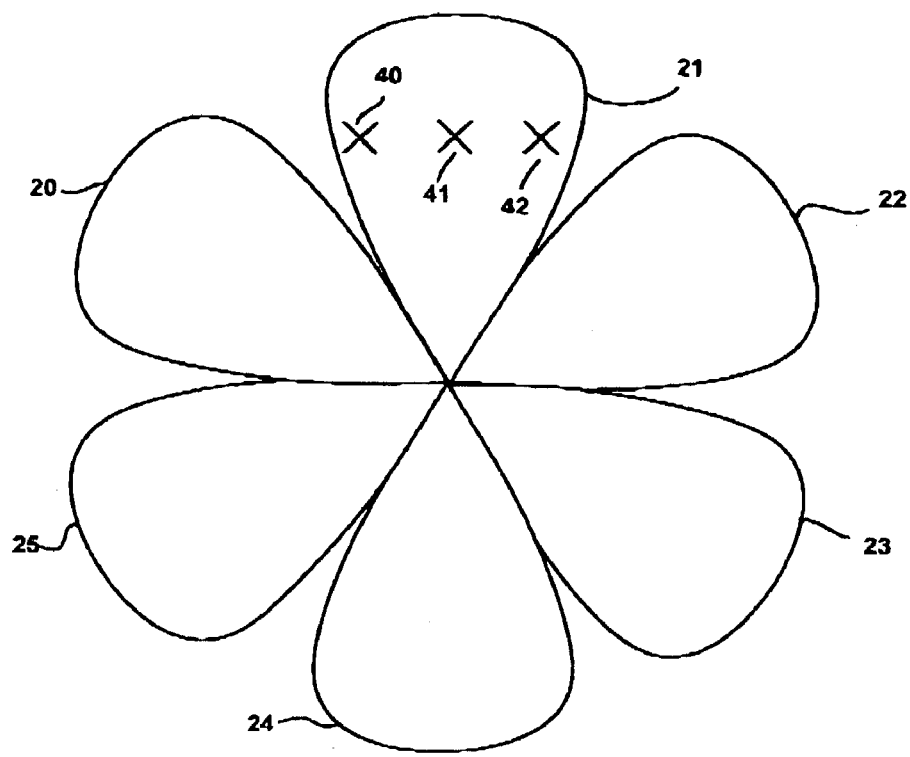
FIGS. 5, 6 and 7 are views of one of the network cells, showing beam adjustment according to a second example.

Referring now to FIG. 5, three mobile devices 40–42 are registered with beam 21. The method of Example 2 is as follows:
1. Mobile devices 40–42 send requests to the NMS 10, requesting downloads of 500 Kb, 5 Mb and 10 Mb files respectively.
2. Since the 500 Kb file is below a preset threshold (for example a 1 Mb threshold), the NMS 10 immediately downloads the 500 Kb file to device 40 via beam 21.
3. At the same time as downloading the file to device 40, the NMS monitors the present network parameters and calculates how long the 5 Mb and 10 Mb downloads will take.
4. The NMS then sends messages to devices 41 and 42, such as: "if you decide to download now, the download will take X minutes" (X being the value calculated in the previous step). "If you wish to receive the data now, then please press 1. If you are able to receive the data later, then please press 0 and the data will be sent to you at a later time."
5. If the device 42 enters "1" and the device 41 enters "0", then the NMS 10 adjusts the network parameters as shown in FIG. 6 by:
   a. focusing the beam 21 onto the mobile device 42;
   b. deregistering the mobile devices 40,41 from the beam 21;
   c. broadening the adjacent beam 20; and
   d. registering the mobile devices 40,41 with the beam 20.
6. The 10 Mb data download to device 42 is then made via focused beam 21.
7. The NMS 10 determines the Best Time for Download (BTD) for the 5 Mb file to device 41. This is done by performing a historical analysis of the network (for instance over the last month) to determine when the lowest data rates are being handled by the network. For instance this may turn out to be at 2 am on a Tuesday morning.
8. The NMS 10 then sends a message to the mobile device 41 such as "Download scheduled for 2 am Tuesday. OK?"
9. If the BTD is acceptable, then the user inputs an OK message and the data is downloaded at the BTD. The NMS 10 makes any necessary network changes at the BTD, such as the changes described above.
10. If both of the devices 41,42 enter "1", then the NMS 10 adjusts the network parameters as shown in FIG. 7 by:
    a. focusing the beam 21 onto the mobile device 41;
    b. deregistering the mobile devices 40,42 from the beam 21;
    c. focusing the beam 22 onto the mobile device 42;
    d. registering the mobile device 42 with the beam 22;
    e. broadening beams 20 and 23; and
    f. registering the mobile device 40 with the beam 20.
11. The 5Mb data download to device 41 is then made via focused beam 21 and the 10 Mb data download to device 42 is made via focused beam 22.

EXAMPLE 3

Starting from the situation shown in FIG. 5 (with three mobile devices 40–42 registered with beam 21), the method of Example 3 is as follows:
1. Mobile devices 40–42 send requests to the NMS 10, requesting downloads of 500 Kb, 5 Mb and 10 Mb files respectively.
2. Since the 500 Kb file is below a preset threshold (for example a 1 Mb threshold), the NMS 10 immediately downloads the 500 m file to device 40 via beam 21.
3. Since the 5 Mb and 10 Mb files are above the 1 Mb threshold, the NMS 10 places the requests in a queue. The order of the queue is based on the time of receipt of the request. If the requests are received simultaneously, then the smaller file is placed in the queue above the larger file. In this example, the 5 Mb request for device 41 is placed in the queue above the 10 Mb request for device 42.
4. The NMS 10 adjusts the network parameters as shown in FIG. 8 by:
   a. focusing the beam 21 onto the mobile device 42;
   b. deregistering the mobile devices 40,41 from the beam 21;
   c. broadening the adjacent beams 20,22;
   d. registering the mobile device 40 with the beam 20; and
   e. registering the mobile device 42 with the beam 22.
5. The 5 Mb data download to device 41 is then made via focused beam 21.
6. At the same time as step 4, the NMS monitors the present network parameters and calculates how long the 5 Mb download will take.
7. The NMS 10 then sends a message to device 42 such as: "since your request is greater than 1 Mb, you have been placed in a queue. We estimate that download will commence in Y minutes" (Y being the value calculated in the previous step).
8. At the end of the 5 Mb download to device 41, the NMS 10 adjusts the network parameters as shown in FIG. 9 by:
   a. focusing the beam 21 onto the mobile device 42;
   b. deregistering the mobile devices 40,41,42 from the beams 20,21,22;
   c. narrowing the beam 22 to its original 60 degree width;
   d. broadening the beam 20;
   e. registering the mobile devices 40,41 with the beam 20; and
   f. registering the mobile device 42 with the beam 21.
9. The 10 Mb data download to device 42 is then made via focused beam 21.

Beam modification is performed in Examples 1–3 above by narrowing the azimuthal beam width and/or adjusting the azimuth beam angle. However, other beam pattern parameters may be adjusted such as elevation beam width or elevation beam angle (ie downtilt). Various suitable methods of adjusting these beam pattern parameters are described in WO 02/05383.

More specifically, as described in WO 02/05383, each base station may have a number of antennas for communicating with the mobile devices via an antenna beam having a width, azimuth angle and downtilt angle, the antenna including: a two dimensional array of radiating elements; and a feed network from a feed line to the radiating elements, the feed network including: downtilt phase shifting means for varying the phase of signals supplied to or received from the radiating elements so as to vary the downtilt angle of the antenna beam; azimuth phase shifting means for varying the phase of signals supplied to or received from the radiating elements so as to vary the azimuth angle of the antenna beam; and beam width adjustment means for varying the power or phase of signals supplied to or received from the radiating elements so as to vary the width of the antenna beam.

Alternatively, as also described in WO 02/05383, each base station may have a number of antennas for communicating with the mobile devices via an antenna beam having a width and an angle, the antenna including: a plurality of radiating elements; and a feed network from a feed line to the radiating elements, the feed network including: power dividing means for varying the division of power between radiating elements so as to vary the width of the antenna beam; and phase shifting means for varying the phase of signals supplied to or received from the radiating elements so as to vary the angle of the antenna beam.

Typically the or each phase shifting means is adjusted by varying the relative position of two or more phase shifting components.

As an alternative to the beam pattern adjustments described in WO 02/05383, the beam power may be adjusted.

The adjustments described above in Examples 1–3 maximize the data transfer rate and make efficient use of the network resources, giving savings in operating expenses.

Although Examples 1–3 above are given for a download to the mobile device, a similar process will be followed for an upload from the mobile device.

While the present invention has been illustrated by the description of the embodiments thereof, and while the embodiments have been described in detail, it is not the intention of the Applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of the Applicant's general inventive concept.

The invention claimed is:

1. A method of managing a wireless communication network, the network including a plurality of antennas for communicating with devices via antenna beams, each antenna beam having a set of beam parameters, the network including a number of sectors, the method including the steps of:
    a) receiving one or more requests for transfer of a computer data file from a plurality of devices;
    b) distributing a communication load more evenly between sectors in response to the requests for transfer of the computer data file, by modifying a plurality of antenna beams by adjusting one or more of the beam parameters of each antenna beam; and
    c) communicating with at least one of the devices via a modified antenna beam.

2. A method according to claim 1 wherein at least one of the requests includes file information.

3. A method according to claim 2 wherein the file information includes a file size indicator.

4. A method according to claim 3 including the steps of: determining whether the file size indicator exceeds a predetermined threshold; and performing step b) if the size of the data file exceeds the predetermined threshold.

5. A method according to claim 1 including the steps of determining a best time for performing an upload or download specified in one of the requests; and performing step b) at the determined best time.

6. A method according to claim 5 wherein the best time is determined in accordance with historical network data.

7. A method according to claim 1 including the steps of transmitting a query to the device in response to at least one of the requests, receiving a query response from the device; and performing step b) in accordance with the query response.

8. A method according to claim 7 wherein the time of performing step b) varies in accordance with the query response.

9. A method according to claim 1 wherein a first antenna beam is modified in step b) by adjusting the power of the first antenna beam.

10. A method according to claim 9 wherein a second antenna beam is modified in step b) by adjusting the power of the second antenna beam.

11. A method according to claim 1 wherein a first antenna beam is modified in step b) by adjusting the pattern of the first antenna beam.

12. A method according to claim 11 wherein the pattern of the first antenna beam is adjusted by adjusting the width and/or angle of the first antenna beam.

13. A method according to claim 12 wherein the pattern of the first antenna beam is adjusting by narrowing the elevation and/or azimuth width of the first antenna beam.

14. A method according to claim 12 wherein the pattern of the first antenna beam is adjusting by adjusting the elevation and/or azimuth angle of the first antenna beam.

15. A method according to claim 12 wherein the pattern of the second antenna beam is adjusting by adjusting the width and/or angle of the second antenna beam.

16. A method according to claim 15 wherein the pattern of the second antenna beam is adjusting by broadening the elevation and/or azimuth width of the second antenna beam.

17. A method according to claim 15 wherein the pattern of the second antenna beam is adjusting by adjusting the elevation and/or azimuth angle of the second antenna beam.

18. A method according to claim 1 wherein each device is a mobile device.

19. A method according to claim 18 wherein the network is a PCS or cellular network.

20. A method according to claim 18 wherein the network is a Local Area Network (LAN).

21. A method according to claim 1, wherein distributing a communication load more evenly between sectors comprises distributing a number of users more evenly between sectors.

22. A method according to claim 1, wherein distributing a communication load more evenly between sectors comprises distributing bandwidth requirements more evenly between sectors.

23. A method according to claim 1, wherein step b) comprises altering an angular width of each of a plurality of sectors.

24. A method of managing a wireless communication network, the network including a plurality of antennas for communicating with devices via antenna beams, each antenna beam having a set of beam parameters, the method including the steps of:
    a) receiving one or more requests for transfer of a computer data file from a plurality of devices;
    b) modifying a first antenna beam in response to the requests for transfer of the computer data file by adjusting one or more of the beam parameters of the first antenna beam; and c) communicating with at least one of the devices via the modified first antenna beam.

25. A method of managing a wireless communication network, the network including a plurality of antennas for communicating with devices via antenna beams, each antenna beam having a set of beam parameters, the method including the steps of:
   a) receiving a request for transfer of a computer data file from a device via a first antenna beam;
   b) modifying the first antenna beam in response to the request for transfer of the computer data file by adjusting one or more of the beam parameters of the first antenna beam; and
   c) communicating with the device via the modified first antenna beam.

26. A method of managing a wireless communication network, the network including a plurality of antennas for communicating with devices via antenna beams, each antenna beam having a set of beam parameters, the method including the steps of:
   a) receiving a request for transfer of a computer data file from a device;
   b) modifying a first antenna beam in response to the request for transfer of the computer data file by adjusting one or more of the beam parameters of the first antenna beam, wherein the beam parameters are members of the group consisting of beam width and beam power; and
   c) communicating with the device via the modified first antenna beam.

27. A method of managing a wireless communication network, the network including a plurality of antennas for communicating with devices via antenna beams, each antenna beam having a set of beam parameters, the method including the steps of:
   a) receiving a request for transfer of a computer data file from a device;
   b) modifying a first antenna beam in response to the request for transfer of the computer data file by adjusting one or more of the beam parameters of the first antenna beam;
   c) communicating with the device via the modified first antenna beam; and
   d) modifying at least one other antenna beam in order to maintain a desired coverage in the network.

28. A network management system for managing a wireless communication network including a plurality of antennas for communicating with devices via antenna beams, each antenna beam having a set of beam parameters, the network management system being configured to:
   a) receive one or more requests for transfer of a computer data file from a plurality of devices; and
   b) issue at least one modification request in response to the requests for transfer of the computer data file, the modification request(s) causing a communication load to be more evenly distributed between sectors, by modifying a plurality of antenna beams by adjusting one or more of the beam parameters of each antenna beam.

29. A wireless communication network including a plurality of antennas for communicating with devices via antenna beams, each antenna beam having a set of beam parameters, the network being configured to:
   a) receive one or more requests for transfer of a computer data file from a plurality of devices;
   b) distribute a communication load more evenly between sectors in response to the requests for transfer of the computer data file, by modifying a plurality of antenna beams by adjusting one or more of the beam parameters of each antenna beam, and
   c) communicate with at least one of the devices via at least one of the modified antenna beams.

30. A method of managing a wireless communication network, the network including a plurality of antennas for communicating with devices via antenna beams, each antenna beam having a set of beam parameters, the network including a number of sectors, the method including the steps of:
   a) receiving one or more requests for transfer of a computer data file from a plurality of devices;
   b) distributing a communication load more evenly between sectors in response to the requests for transfer of the computer data file, by modifying a plurality of antenna beams by adjusting one or more of the beam parameters of each antenna beam; and
   c) communicating with at least one of the devices via a modified antenna beam, wherein at least one of the requests includes file information in the form of a computer file size indicator;
   d) determining whether the computer file size indicator exceeds a predetermined threshold; and e) performing step (b) if the size of the data file exceeds the predetermined threshold.

31. A method of managing a wireless communication network, the network including an antenna for communicating with a plurality of devices via an antenna beam having a set of beam parameters, the network including a number of sectors, the method including the steps of:
   a) receiving a request for transfer of a computer data file from at least one device;
   b) distributing a communication load more evenly between sectors in response to the request for the computer data file transfer by adjusting one or more of the beam parameters of the antenna beam; and
   c) communicating with at least one of the devices via the parameter-adjusted antenna beam.

32. The method of claim 31 wherein a request for transfer of the computer data file is received from a plurality of devices.

33. The method of claim 31 wherein the network includes a plurality antenna beams, each of which have at least one beam parameter adjusted in response to receipt of said request for transfer of the computer data file.

34. The method of claim 31 wherein a request for transfer of the computer data file is received from a plurality of devices.

35. A method according to claim 31 including the steps of:
   determining whether a file size indicator included in the request exceeds a predetermined threshold; and
   performing step b) if a size of the data file exceeds the predetermined threshold.

36. A method according to claim 31 wherein a first antenna beam and/or a second antenna beam is modified in step b) by adjusting the power of the antenna beam and/or by adjusting the pattern of the antenna beam.

37. A method according to claim 31 wherein a pattern of a first antenna beam and/or a second antenna beam is adjusted by modifying a beam parameter selected from the group consisting of width, angle, elevation, azimuth width and azimuth angle.

* * * * *